US009382768B2

(12) United States Patent  
Garber et al.

(10) Patent No.: US 9,382,768 B2  
(45) Date of Patent: Jul. 5, 2016

(54) TUBULAR HANDLING SYSTEM AND METHOD

(71) Applicant: Offshore Energy Services, Inc., Houma, LA (US)

(72) Inventors: Gary Russell Garber, Houma, LA (US); Kevin Michael Guidry, Houma, LA (US); Dennis Penisson, Houma, LA (US)

(73) Assignee: Offshore Energy Services, Inc., Houma, LA (US)

( * ) Notice: Subject to any disclaimer, the term of this patent is extended or adjusted under 35 U.S.C. 154(b) by 212 days.

(21) Appl. No.: 14/108,959

(22) Filed: Dec. 17, 2013

(65) Prior Publication Data

US 2015/0167410 A1 Jun. 18, 2015

(51) Int. Cl.
| | |
|---|---|
| *B23Q 17/00* | (2006.01) |
| *E21B 19/16* | (2006.01) |
| *B23P 11/00* | (2006.01) |
| *F16F 15/06* | (2006.01) |
| *E21B 19/20* | (2006.01) |

(52) U.S. Cl.
CPC ............. *E21B 19/166* (2013.01); *E21B 19/164* (2013.01); *F16F 15/06* (2013.01); *Y10T 29/49766* (2015.01); *Y10T 29/49826* (2015.01)

(58) Field of Classification Search
CPC ......... E21B 19/07; E21B 19/10; E21B 19/24; E21B 19/165; E21B 19/16; E21B 19/164; E21B 19/166; E21B 17/1057; F16F 15/022; F16F 15/06; F16F 15/067; F16F 15/121; F16F 15/1216; F16F 15/1337; Y10T 29/49766; Y10T 29/49771; Y10T 29/53; Y10T 29/53039; Y10T 29/53061; Y10T 29/53087; Y10T 29/53091
See application file for complete search history.

(56) References Cited

U.S. PATENT DOCUMENTS

| | | | |
|---|---|---|---|
| 1,514,195 A | | 11/1924 | Brandon |
| 1,907,461 A | | 5/1933 | Sunde |
| 2,527,456 A | | 10/1950 | Schmeling |
| 2,862,690 A | | 12/1958 | Mason |
| 3,131,586 A | | 5/1964 | Wilson |
| 3,464,507 A | | 9/1969 | Alexander et al. |
| 3,902,385 A | | 9/1975 | Haby |
| 3,916,500 A | * | 11/1975 | Brown .................... E21B 19/15 175/85 |
| 3,921,473 A | | 11/1975 | Boyadjieff et al. |
| 4,023,449 A | * | 5/1977 | Boyadjieff ............. E21B 19/10 81/57.16 |
| 4,092,881 A | | 6/1978 | Jurgens et al. |
| 4,290,304 A | | 9/1981 | Eckel |
| 4,437,218 A | | 3/1984 | Pridy |
| 4,444,273 A | | 4/1984 | Ruby |
| 4,445,402 A | * | 5/1984 | Farr ...................... E21B 19/164 173/164 |
| 4,474,254 A | | 10/1984 | Etter et al. |
| 4,492,134 A | | 1/1985 | Reinholdt et al. |

(Continued)

*Primary Examiner* — Essama Omgba  
(74) *Attorney, Agent, or Firm* — Jones Walker LLP

(57) ABSTRACT

A modular system and process for connecting a first and second tubular. The system may comprise a skid, a tong assembly operatively associated with the skid, a hydraulic power unit, operatively positioned on said skid, a spring assembly that includes spring stands, a frame containing the tong assembly, springs, rods disposed within the spring, and lanyards attached to the rods on a first end and attached to the base on a second end so that vibratory and displacement forces created during torqueing of the first tubular onto the second tubular are absorbed. The system may also include a sensor, operatively positioned on the skid, for sensing an applied torque to the first and second tubular, and generating a sensor signal.

38 Claims, 11 Drawing Sheets

(56) References Cited

U.S. PATENT DOCUMENTS

| | | |
|---|---|---|
| 4,494,425 A | 1/1985 | Shewmake, Sr. |
| 4,573,359 A | 3/1986 | Carstensen |
| 4,616,512 A | 10/1986 | Himmelstein et al. |
| 4,619,159 A | 10/1986 | Kuerk |
| 4,738,145 A | 4/1988 | Vincent et al. |
| 4,739,681 A | 4/1988 | Pietras |
| 4,759,414 A | 7/1988 | Willis |
| 4,972,741 A | 11/1990 | Sibille |
| 5,081,888 A | 1/1992 | Schulze-Beckinghausen |
| 5,099,725 A | 3/1992 | Bouligny, Jr. et al. |
| 5,174,175 A | 12/1992 | Bouligny |
| 5,245,877 A | 9/1993 | Ruark |
| 5,259,275 A | 11/1993 | Schulze-Beckinghausen |
| 5,505,565 A | 4/1996 | Canales |
| 5,823,267 A | 10/1998 | Burge et al. |
| 5,880,430 A | 3/1999 | Wein |
| 6,263,763 B1 * | 7/2001 | Feigel, Jr. ............. E21B 19/166 81/57.19 |
| 6,318,214 B1 * | 11/2001 | Buck .................... E21B 19/164 81/57.16 |
| 6,364,011 B1 * | 4/2002 | Bergeron ............. B23P 19/061 166/378 |
| 6,530,432 B2 | 3/2003 | Gipson |
| 6,591,471 B1 * | 7/2003 | Hollingsworth ........ E21B 19/16 166/85.1 |
| 6,691,801 B2 | 2/2004 | Juhasz et al. |
| 6,752,043 B2 | 6/2004 | Carlson |
| 6,793,020 B2 | 9/2004 | Courts |
| 6,863,809 B2 | 3/2005 | Smith et al. |
| 6,880,430 B2 | 4/2005 | Carlson |
| 7,000,503 B2 | 2/2006 | Dagenais et al. |
| 7,062,991 B1 | 6/2006 | West et al. |
| 7,100,698 B2 | 9/2006 | Kracik et al. |
| 7,104,316 B1 * | 9/2006 | Hobgood ............. E21B 19/165 166/117.5 |
| 7,163,335 B2 | 1/2007 | Dishaw et al. |
| 7,240,726 B2 | 7/2007 | Cain et al. |
| 7,387,050 B2 * | 6/2008 | Slettedal ............... E21B 19/163 81/57.16 |
| 7,413,398 B2 | 8/2008 | Bangert et al. |
| 7,464,612 B2 | 12/2008 | Manella et al. |
| 7,559,360 B2 * | 7/2009 | Hobgood ............. E21B 19/165 166/379 |
| 7,584,809 B1 | 9/2009 | Flud |
| 7,600,585 B2 * | 10/2009 | Patton .................... E21B 7/027 166/384 |
| 7,617,873 B2 | 11/2009 | Lovell et al. |
| 7,690,281 B2 * | 4/2010 | Hobgood ............. E21B 19/165 81/57.16 |
| 7,891,418 B2 | 2/2011 | Begnaud et al. |
| 8,172,497 B2 | 5/2012 | Orgeron et al. |
| 8,192,129 B1 | 6/2012 | Orgeron |
| 8,250,816 B2 | 8/2012 | Donnally et al. |
| 8,453,541 B2 | 6/2013 | Dagenais et al. |
| 9,212,778 B2 * | 12/2015 | Winter ................. F16M 13/022 |
| 2002/0079105 A1 * | 6/2002 | Bergeron ............. B23P 19/061 166/379 |
| 2004/0216906 A1 * | 11/2004 | Rogers ................. E21B 19/165 173/216 |
| 2008/0011470 A1 * | 1/2008 | Hobgood ............. E21B 19/165 166/77.1 |
| 2008/0168827 A1 | 7/2008 | Weems |
| 2008/0202291 A1 | 8/2008 | Bouligny et al. |
| 2009/0065189 A1 * | 3/2009 | Hobgood ............. E21B 19/165 166/77.51 |
| 2009/0065223 A1 | 3/2009 | Bouligny, Jr. |
| 2009/0126536 A1 | 5/2009 | Begnaud et al. |
| 2010/0270033 A1 | 10/2010 | Angelle et al. |
| 2010/0276954 A1 | 11/2010 | Dagenais et al. |
| 2011/0000682 A1 | 1/2011 | Webre et al. |
| 2013/0075114 A1 | 3/2013 | Dekker et al. |

* cited by examiner

TUBULAR HANDLING SYSTEM AND METHOD

BACKGROUND OF THE INVENTION

This invention relates to a tubular handling system and method. More specifically, but not by way of limitation, this invention relates to a modular system for threadedly engaging tubular members.

In the drilling and production of hydrocarbons, operators utilized tubular members such as work string, drill strings, production tubing, and snubbing pipe in wells and wellbores. Many times these wells and wellbores are located in remote areas with harsh environments. Operators will find it necessary to threadedly engage a first tubular member with a second tubular member. As well understood by those of ordinary skill in the art, the application of torque is critical for several reasons. For instance, the threadedly connected tubulars must need to contain thousands of pounds of pressure in a caustic, hot downhole environment. Failures of tubulars may mean catastrophic failure of the tubular, platform and rig, which in turn may mean loss of human life as well as property and environmental damage.

Operators will measure the applied torque in an effort to assure that the proper torque is applied for making-up tubular connections. Prior art systems attempt to measure applied torque and record the applied torque for analysis and record keeping.

SUMMARY OF THE INVENTION

In one embodiment, a modular system for connecting a first tubular with a second tubular is disclosed. The system comprising a skid and a tong assembly operatively associated with the skid, wherein the tong assembly includes a rotary tong for applying a torque force to the tubular member, with the rotary tong having a receiving end for receiving the first tubular and a back-up tong, operatively associated with the rotary tong, for providing a fixed point for torqueing the first tubular, with the back-up tong configured to receive and grasp the second tubular. The system also includes a hydraulic power unit, operatively positioned on the skid, for providing hydraulic power to the rotary tong and back-up tong. The system further comprises a spring assembly including a plurality of spring stands attached to the skid, wherein the spring stands have a top end, a frame containing the tong assembly, a plurality of springs having a proximal end abutting the top end of the spring stands, a plurality of rods disposed within the springs, with the rods containing a stop structure on the rod, and wherein the springs have a distal end abutting the stop structure, and a plurality of lanyards attached to the rods on a first end and attached to the base on a second end so that vibratory and displacement forces created during torqueing of the first tubular onto the second tubular are absorbed.

The system may further comprise sensor means, operatively positioned on the skid, for sensing an applied torque to the first tubular and the second tubular, and generating a sensor signal, and processor means for receiving the sensor signal and generating a torque reading. The system may include a control unit for receiving the torque reading from the processor means and producing a command signal to the hydraulic power unit to provide hydraulic power to the rotary tong and back-up tong. The system may also include a tubular platform, operatively associated with the hydraulic power unit, for raising the first tubular for entry into the tong assembly and advancing means, positioned on the tubular platform, for advancing the first tubular to the tong assembly. A ball transfer device may be included that comprises a ball positioned within a socket, with the ball configured to engage the first tubular, the ball capable of rotating in a 360 degree phase, and a hydraulic activator shaft operatively attached to the hydraulic power unit, the hydraulic power unit capable of delivering hydraulic fluid to the activator shaft so that the ball lifts and lowers during torqueing of the tubular member.

A process for making-up a first tubular with a second tubular is also disclosed. The process may comprise providing a skid with a tong assembly contained thereon, providing a tubular platform that includes: a base; a lifting scissor unit operatively attached to the base, the lifting scissor unit configured to be raised and lowered; and, a landing operatively attached to the lifting scissor unit, and wherein the first tubular rest on the landing. The process further comprises positioning the first tubular on the landing, raising the landing for entry of the first tubular into the tong assembly and advancing the first tubular with rollers contained on the tubular platform to the tong assembly. The process may further include engaging and lifting the first tubular with a ball transfer device, wherein the ball transfer device comprises a ball positioned within a socket, with the ball configured to engage the first tubular and capable of rotating in a 360 degree phase. The process may also comprise inserting the first tubular into the tong assembly and making-up the first tubular and the second tubular. The process may also comprise absorbing vibratory and displacement forces with a spring assembly, wherein the spring assembly comprising: a plurality of spring stands attached to the skid, wherein the spring stands have a top end; a base having attached thereto the tong assembly; a plurality of springs operatively associated with the spring stands, the springs having a proximal end abutting the top end of the spring stands; a plurality of rods disposed within the springs, with the rods containing a stop structure threadedly engaged with thread means on the rods, and wherein the springs have a distal end abutting the nut; a plurality of lanyards having a first end and a second end, the first end attached to the rods and the second end attached to the base; and wherein the vibratory and displacement forces created during torqueing of the first tubular with the second tubular are absorbed by the springs. In one embodiment, the tong assembly includes: a rotary tong for applying a torque force to the first tubular, with the rotary tong having a receiving end for receiving the first tubular; a back-up tong, operatively associated with the rotary tong, for providing a fixed point for torqueing the second tubular, with the back-up tong configured to receive and grasp the second tubular; and wherein the step of making-up the first tubular with the second tubular includes grasping the second tubular with the back-up tong and rotating the first tubular with the rotary tong. In one embodiment, the process may further comprise sensing the torque applied during the making-up step, recording the torque applied as a torque reading, storing the torque reading, and displaying the torque reading. The process may also include releasing the second tubular from the back-up tong, releasing the first tubular from the rotary tong, and rolling the first tubular and the second tubular from the tong assembly with the rollers.

A spring assembly is also disclosed. The spring assembly may comprise: a plurality of spring stands attached to the skid, wherein the spring stands have a top end; a frame having attached thereto the tong assembly; a plurality of springs operatively associated with the spring stands, the springs having a proximal end abutting the top end of the spring stands; a plurality of rods disposed within the springs, with the rods containing a stop structure, and wherein the springs have a distal end abutting the stop structure; and, a plurality of lanyards attached to the rods on a first end and attached to the base on a second end so that vibratory and displacement forces created during torqueing of the tubular member with the collar are absorbed.

In yet another embodiment, a modular system for threadedly connecting a tubular member with a collar is disclosed. In this embodiment, the system may comprise: a skid; a tong assembly operatively associated with the skid, the tong assembly having a rotary tong for applying a torque force to the tubular member, with the rotary tong having a receiving end for receiving the tubular member or collar, a back-up tong, operatively associated with the rotary tong, for providing a fixed point for torqueing the tubular member, with the back-up tong configured to receive and grasp the collar or the tubular member; and, a spring assembly, operatively attached to the skid, for absorbing vibratory and displacement forces created during torqueing of the tubular member onto the collar. The system may also include: a hydraulic power unit, operatively positioned on the skid, for providing hydraulic power to the rotary tong and back-up tong; sensor means, operatively positioned on the skid, for sensing an applied torque to the tubular member and the collar by the rotary tong as a sensor reading; a processor unit for receiving the sensor reading, storing the sensor reading, processing the sensor reading, and displaying the sensor reading; and, a tubular platform, operatively associated with the hydraulic power unit, for raising the tubular member for entry into the tong assembly. In one embodiment, the spring assembly comprises: a plurality of spring stands attached to the skid, wherein the spring stands have a top end; a frame having attached thereto the tong assembly; a plurality of springs operatively associated with the spring stands, the springs having a proximal end abutting the top end of the spring stands; a plurality of rods disposed within the springs, with the rods containing a stop structure threadedly engaged with thread means on the rod, and wherein the springs have a distal end abutting the stop structure; and a plurality of lanyards attached to the rods on a first end and attached to the frame on a second end so that vibratory and displacement forces created during torqueing of the tubular member with the collar are absorbed. Also, the system may include advancing means, positioned on the tubular platform, for advancing the tubular member relative to the tong assembly. In one embodiment, a truck is utilized to transport the system to a rig site, wherein the system further comprises a flatbed configured to contain the skid, wherein the flatbed contains a first segment containing the skid and a second segment attached to the truck, wherein the first and second segment are operatively attached. A crane may be mounted to the skid, with the crane having a swing arm extending from a vertically mounted arm. In one disclosed embodiment, the processor unit may include a graphing module for printing a graph of the torqued applied to the tubular member and the collar thread connection. Additionally, the tubular platform may comprise: a base having a set of wheels for movability; a lifting scissor unit operatively attached to the base, with the lifting scissor unit configured to be raised and lowered by the hydraulic power unit; and a landing operatively attached to the lifting scissor unit, and wherein the tubular member rest on the landing.

In another disclosed embodiment, a modular system for threadedly connecting a tubular member with a collar is disclosed. The system comprises: a skid; a tong assembly operatively associated with the skid, the tong assembly including a rotary tong and a back-up tong; a spring assembly, operatively attached to the skid, for absorbing vibratory and displacement forces created during torqueing of the tubular member onto the collar; a hydraulic power unit, operatively positioned on the skid, for providing hydraulic power to the rotary tong and the back-up tong; and sensor means, operatively positioned on the skid, for sensing an applied torque to the tubular member and the collar by the rotary tong as a sensor reading. The system may also include: a processor unit for receiving the sensor reading, storing the sensor reading, processing the sensor reading, and displaying the sensor reading; and a tubular platform, operatively associated with the hydraulic power unit, for raising the tubular member for entry into the tong assembly. Advancing means, positioned on the tubular platform, for advancing the tubular member relative to the tong assembly and a graphing module for printing a graph of the torqued applied to the tubular member and the collar thread connection may be included. In one embodiment, tubular platform comprises: a base having a set of wheels for movability; a lifting scissor unit operatively attached to the base, the lifting scissor unit configured to be raised and lowered by the hydraulic power unit; and a landing operatively attached to the lifting scissor unit, and wherein the tubular member rest on the landing. In one embodiment, a ball transfer means, operatively attached to the landing, for dampening the transfer of weight of the tubular member during torqueing is included. The ball transfer means may comprise: a ball positioned within a housing, the ball configured to engage the tubular member, with the ball capable of rotating in a 360 degree phase; a hydraulic activator shaft operatively attached to the hydraulic power unit, the hydraulic power unit capable of delivering hydraulic fluid to the activator shaft so that the ball lifts and lowers during torqueing of the tubular member. The scissor unit may include: a first scissor frame containing a first member pivotally attached to a second member; a second scissor frame containing a third member pivotally attached to a fourth member; a hydraulic driver cylinder, operatively connected to the hydraulic power unit, for pivoting the first and second scissor frame so that the landing can be raised and lowered. Also, the hydraulic driver cylinder may comprise a piston disposed within a housing, and wherein the housing is connected to the first scissor frame and the piston is connected to the second scissor frame.

BRIEF DESCRIPTION OF THE PREFERRED EMBODIMENTS

DETAILED DESCRIPTION OF THE PREFERRED EMBODIMENTS

Figure 1:
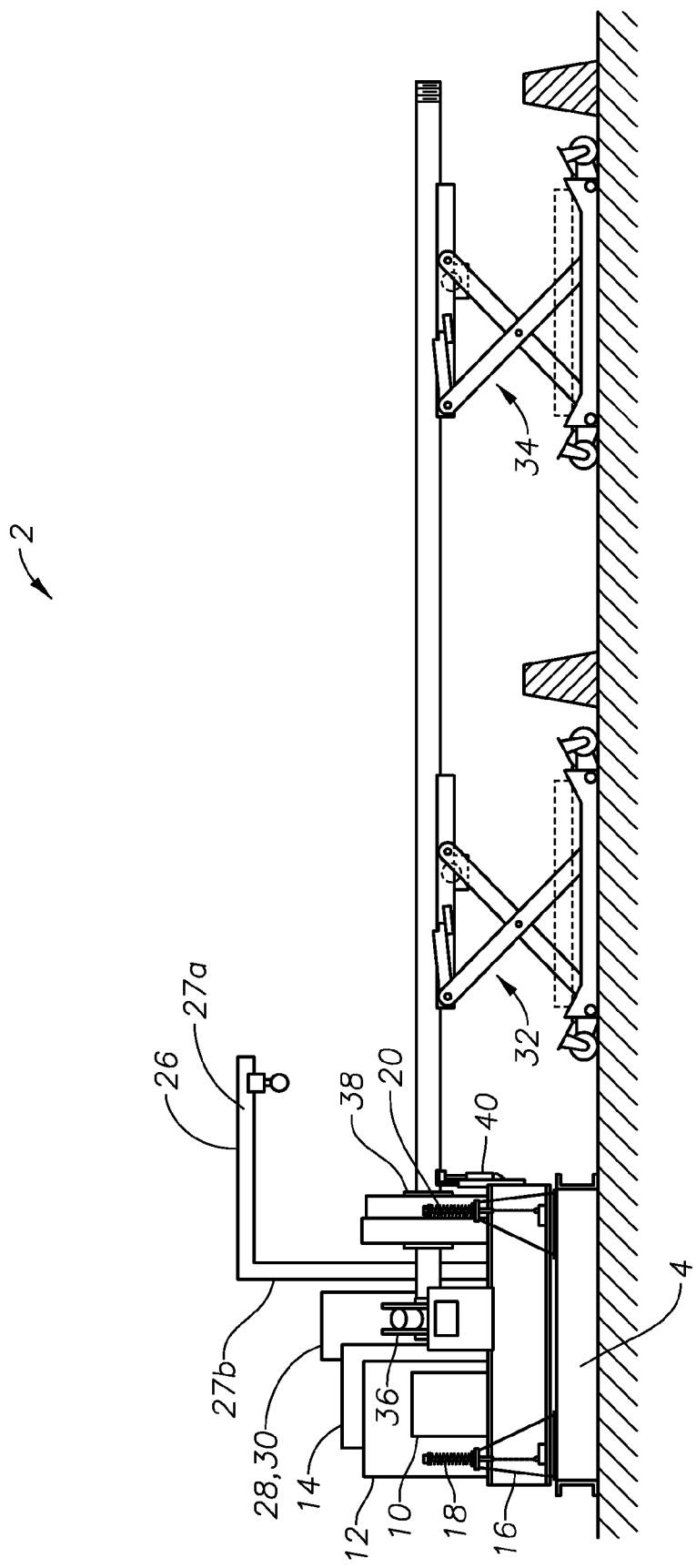
FIG. 1 is a perspective side view of one embodiment of the present system.

Referring now to FIG. 1, a perspective view of one embodiment of the present system 2 will now be described. The system 2 includes the skid unit 4, wherein the skid unit 4 will be operatively associated with the tong assembly, and more specifically, the rotary tong 6 and the back-up tong 8. The skid unit 4 will contain the control unit 10, wherein the control unit 10 directs hydraulic oil from the hydraulic power unit 12 to the various hydraulic components as will be more fully explained later in this disclosure. Hydraulic lines operatively connect the hydraulic components of the system 2 to the hydraulic power unit 12. A diesel engine means 14, which includes the engine and fuel tank, for powering the supply of hydraulic fluid used with the hydraulic power unit 12 is also included.

The skid unit 4 will also contain the spring assembly, seen generally at 16, wherein the spring assembly 16 absorbs vibratory and displacement forces created during the torqueing of the tubulars and collars. The vibratory forces may be as a result of the mechanical and hydraulic equipment during operation and the displacement forces may be the result of bending and twisting of the tubulars during operation. The spring assembly 16, in one embodiment, includes a first spring member 18, a second spring member 20, a third spring member (not seen in this view), and a fourth spring member (not seen in this view). The spring assembly 16 is operatively attached to a tong assembly frame which will be described later in this disclosure.

FIG. 1 depicts the crane member 26 which is mounted to the skid unit 4. The crane 26 includes a vertical arm 27a and a horizontal arm 27b. The crane member 26 can be used to aid in rigging up and rigging down operations once the system 2 is delivered to the remote location. For instance, the crane 26 can be used to store the tubular platforms, as will be more fully described later in the disclosure. An electric air compressor means 28 for providing pressure to the hydraulic system is also included. An electric generator 30 is also included on the skid as well as an air compressor means that contains an air tank.

FIG. 1 also illustrates the tubular platforms 32, 34 for raising the tubular member for entry into the tong assembly and in particular the rotary tong 6 or back-up tong 8. The tubular platforms 32, 34 can also lower the tubular. During transportation of the skid 4, the tubular platforms 32, 34 are positioned on the skid 4, with the aid of the crane 26 so that the skid 4 may contain the entire components of the system 2 for purposes of transporting the system 2 to different locations. The tubular platforms 32, 34 are operatively associated with the hydraulic power unit 12, which will be described in further detail later in this description.

The back-up tong 8 includes movable jaws 36 which can grasp tubulars and hold stationary. The rotary tong 6 has means for spinning the tubulars, seen generally at 38, and thus, the rotary tong 6 and the back-up tong 8 work in conjunction. In one embodiment, the tubulars may include a tubular (such as a casing string) and a collar. The back-up tong 8 and the rotary tong 6 are components of the tong assembly, which will be further descripted with reference to FIG. 4A. The rotary tong 6 and back-up tong 8 are commercially available from McCoy Global under the name Type III Bucking Unit (Power & Control Console) CLEBU1175-3. It should be noted that the tubular can either be inserted into the rotary tong 6 first and then into the back-up tong 8; or, the tubular can be first inserted into the back-up tong 8 and then into the rotary tong 6. In the instance where the tubular is first inserted through the rotary tong 6, the tubular can contain a collar threadedly attached on one end, and wherein the collar will be grasped by the back-up tong. In the instance where the tubular is inserted first through the back-up tong 8, the back-up tong 8 can grasp the tubular and the rotary tong 6 will engage the collar. Additionally, FIG. 1 depicts the telescoping tubular stand 40 that can be used for lifting, lowering and/or resting the tubular if the operator deems it necessary during operation . . . . The tubular stand 40 can be raised and lowered by the operator via the control unit 10.

In one disclosed embodiment, sensors will measure the applied torque in foot-pounds. A processor unit of the system 2 will receive the sensor signal, process and record the applied torque and provide means for displaying the applied torque in a chart format to the operator, as will be more fully explained later in the disclosure.

Figure 2:
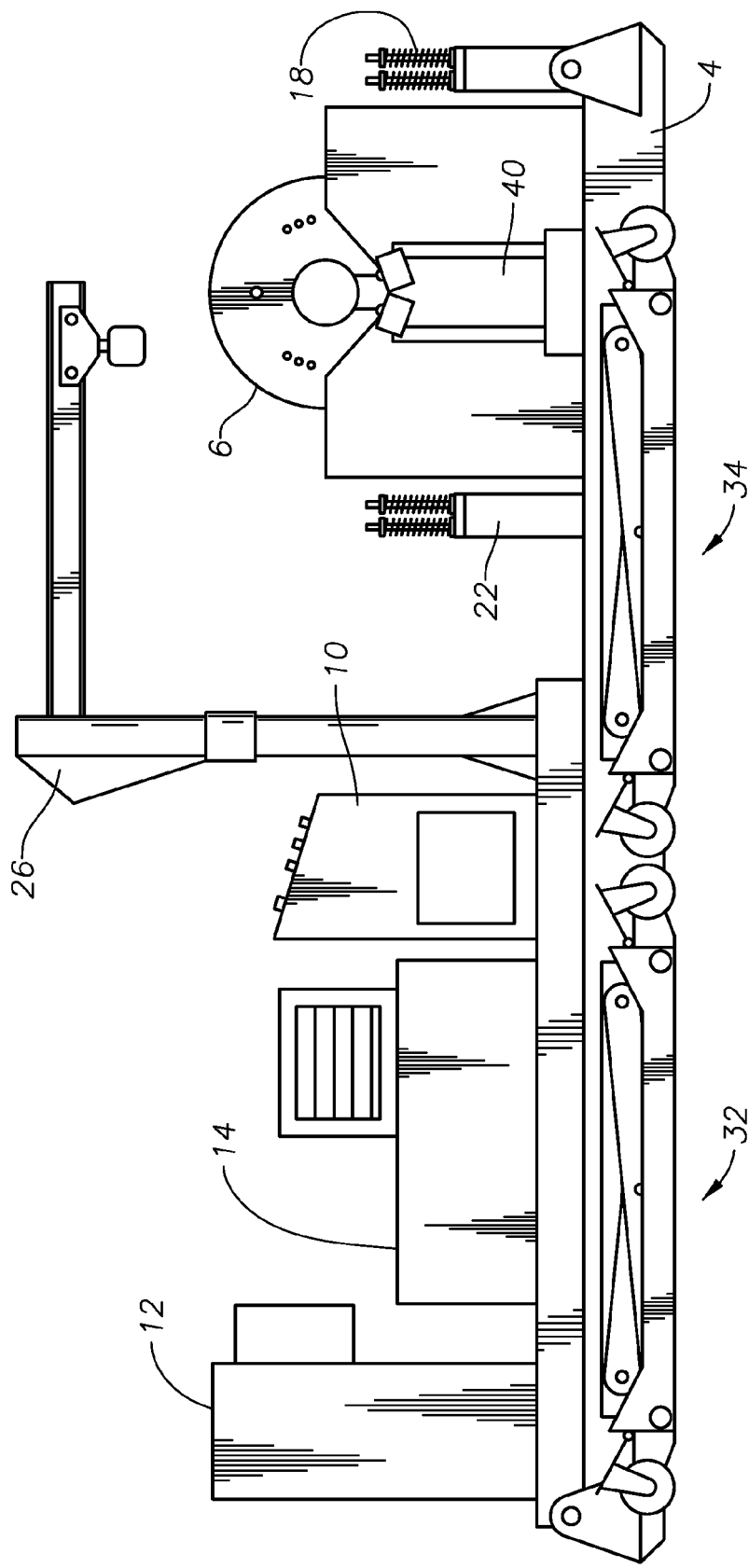
FIG. 2 is a partial side view of one embodiment of the present system seen in FIG. 1.

Referring now to FIG. 2, a partial second side view the system 2 seen in FIG. 1 will now be described. It should be noted that like numbers appearing in the various figures refer to like components. FIG. 2 depicts the hydraulic power unit 12 operatively associated with the control unit 10 as well as the diesel engine means 14. The spring members 18, 22 are shown in this view along with the tubular centering guide stand 40. The back-up tong 8 and the rotary tong 6 are also depicted in this view. The tubular platforms 32, 34 are depicted in the folded (i.e. collapsed) position. As noted earlier, the folded tubular platform 32, 34 can be placed onto the skid for transportation.

Figure 3A:
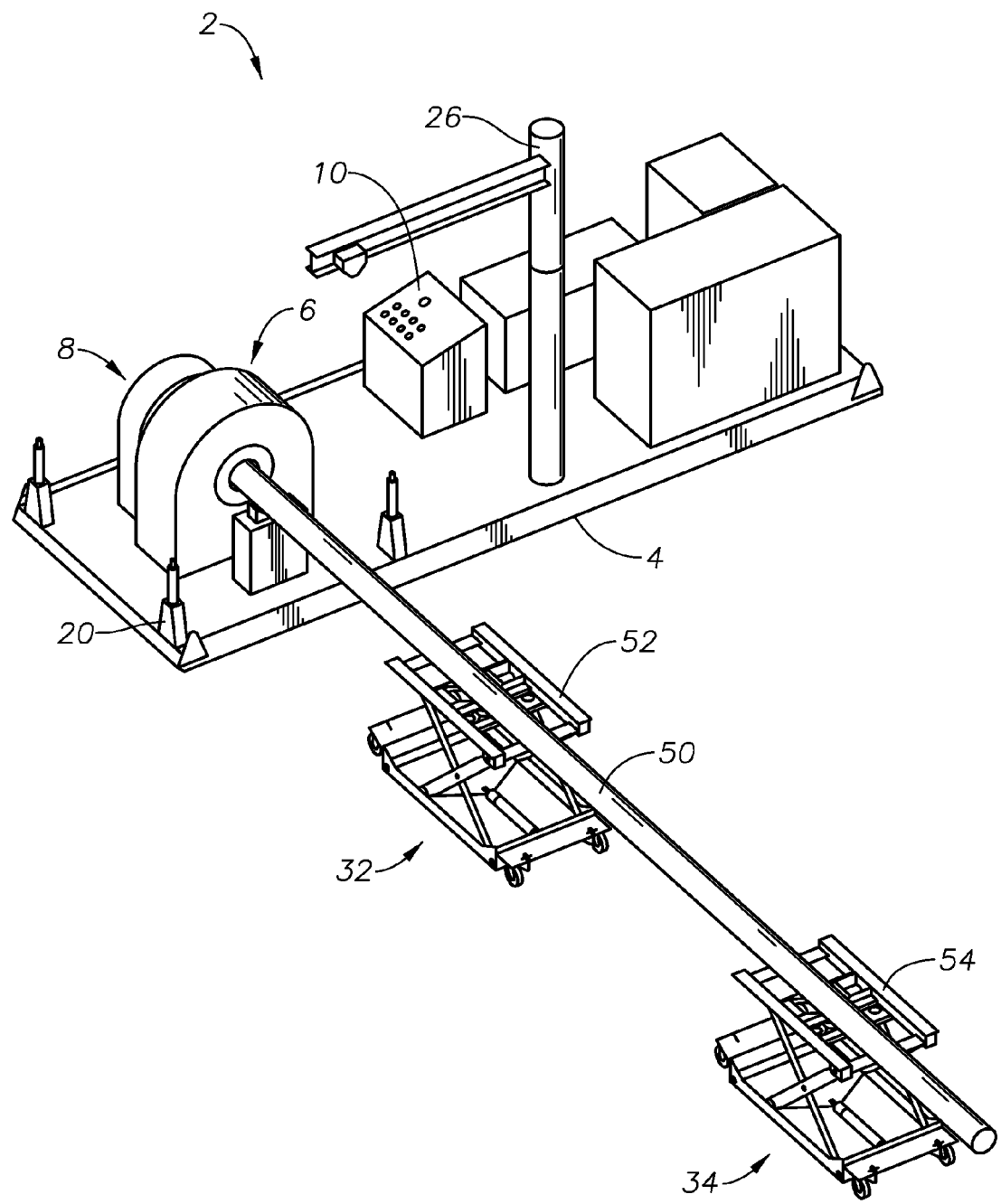
FIG. 3A is a perspective view of the system seen in FIG. 1 while in the process of connecting a first and second tubular.

FIG. 3A is a perspective view of the system 2 seen in FIG. 1 while making up a tubular. More specifically, a tubular member 50 is shown, wherein the tubular member 50 may be a casing string used in a wellbore as well understood by those of ordinary skill in the art. Examples of other types of tubular members may be production tubing, drill string, collars, and snubbing pipe. The tubular member 50 may have outer threads on both ends and wherein on one end a second tubular (such as a collar) is threadedly attached (not seen in this view). As seen in FIG. 3, the collar end has been inserted into the rotary tong 6 and the collar will be operatively associated with the back-up tong 8. As FIG. 3A depicts, the tubular platforms 32, 34 have the tubular member 50 positioned on the landing 52 of the tubular platform 32 and the landing 54 of the tubular platform 34. As will be more fully explained later in this disclosure, the tubular platforms 32, 34 will raise the tubular member 50 as well as lower the tubular member 50 via the control unit 10. Additionally, advancing means (not seen in this figure) for advancing the tubular member 50 into and out of the tong assembly may be provided on the tubular platforms 32, 34.

Figure 3B:
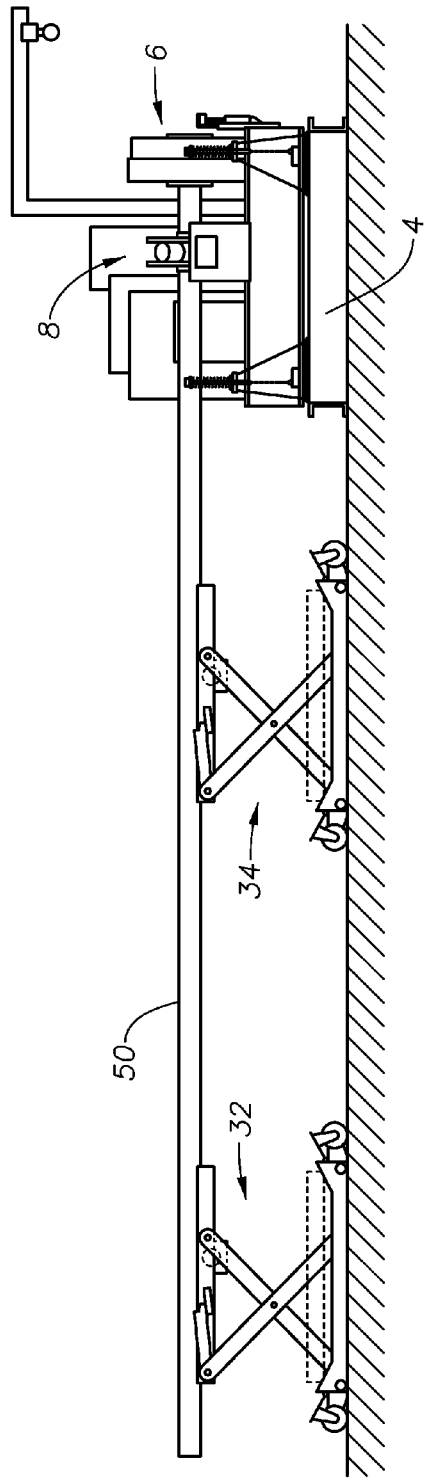
FIG. 3B is a perspective view of a second embodiment of the system while in the process of connecting a first and second tubular.

FIG. 3B is a perspective view of a second embodiment. In this alternate embodiment of FIG. 3B, the first tubular is inserted through the back-up tong 8 and the back-up tong 8 grasps the tubular 50 and the rotary tong 6 grasps the collar for torqueing. In this alternate embodiment, the operator can also break (i.e. unscrew) the thread connections or make-up (i.e. screw) the thread connections. Hence, with this alternate embodiment, the tubular platforms 32, 34 would be positioned on the opposite side of the skid 4 illustrated in FIGS. 1 and 2. An aspect of this disclosure is that it is possible to have the tubular member 50 to be grasped and held by the back-up tong 8 and the collar 66 be grasped and rotated by the rotary tong 6.

Figure 4B:
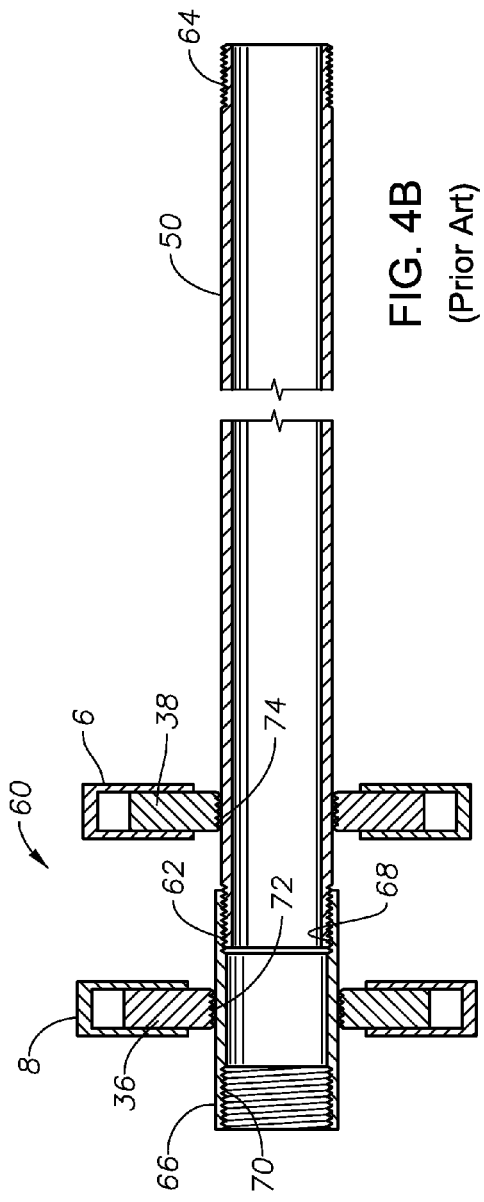
FIG. 4B is a partial cross-sectional view of the tong assembly seen in FIG. 4A with a tubular member and collar disposed therein.
Figure 4A:
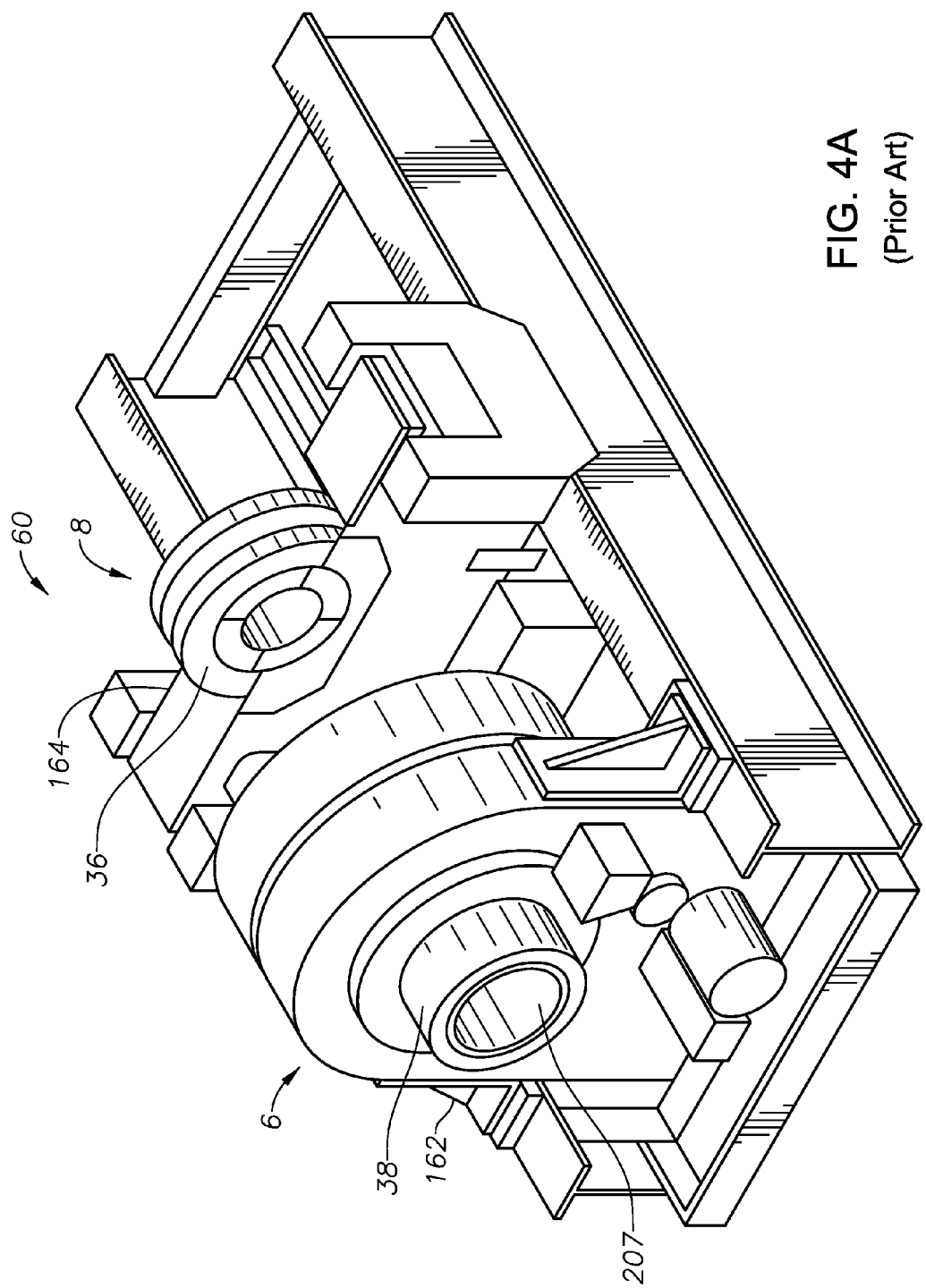
FIG. 4A is a perspective view of a prior art tong assembly.

FIG. 4A is a perspective view of a prior art tong assembly 60. As noted earlier, the tong assembly includes the back-up tong 8 and the rotary tong 6. As previously mentioned, the tong assembly 60 is commercially available from McCoy Global under the name Type III Bucking Unit (Power & Control Console) CLEBU1175-3. FIG. 4B is a partial cross-sectional view of the tong assembly, seen generally at 60, with the tubular member 50 operatively associated therein. More specifically, the tubular member 50 will have thread means 62 disposed on one end and thread means 64 disposed on the other end. As seen in FIG. 4B, a collar 66 is provided, and wherein the collar 66 has internal thread means 68, 70. FIG. 4B depicts the outer threads 62 of tubular member 50 are engaged with the inner threads 68 of the collar 66. In operation of the tong assembly 60, the tubular member 50 is inserted into the tong assembly 60 according to one disclosed embodiment. The back-up tong 8 will close and grasp the collar 66 via the movable jaw 36 with the stationary teeth 72. The rotary tong 6 will close and grasp the tubular member 50 via the spinning means 38 with the rotary teeth 74. In one disclosed embodiment, the operator, utilizing the control unit 10, will cause the rotary teeth 74 to rotate while the stationary teeth 72 grasp and hold the collar 66 so that torque is applied to make-up the connection. FIG. 4A also depicts the sensors 162, 164 for measuring the applied torque in foot-pounds. In one embodiment, the sensors 162, 164 are hard wired to the processor unit.

Figure 5A:
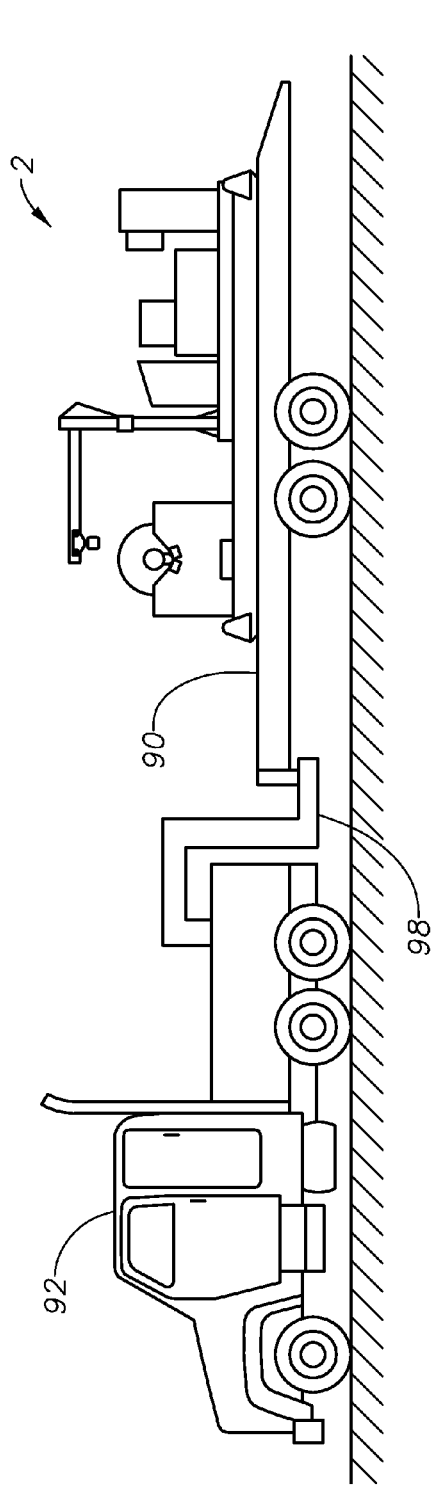
FIG. 5A is a perspective view of the system of FIG. 1 mounted on a flatbed, wherein the flatbed is attached to a transportation vehicle.
Figure 5B:
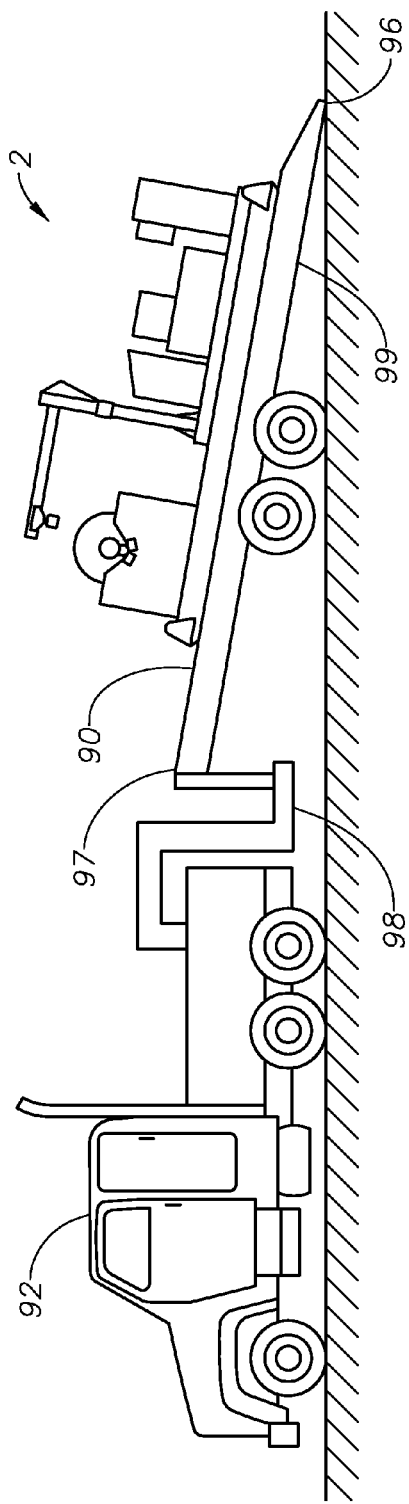
FIG. 5B is a perspective view of the system seen in FIG. 5A wherein the flatbed has been pivoted in order to offload or on-load the skid unit.

Referring now to FIG. 5A, a perspective view of the system 2 of FIG. 1 mounted on a flatbed trailer 90, wherein the flatbed trailer 90 has wheels and is attached to a transportation vehicle 92, such as a truck. An aspect of one embodiment herein disclosed is the modular nature of the system 2 and the ability to transport the system 2 to remote areas where a drilling rig may be located. Hence, the entire system 2 can be loaded onto the flatbed trailer 90 and delivered to a user specified location. FIG. 5B is a perspective view of the system 2 seen in FIG. 5A wherein the flatbed trailer 90 has been titled. Once the vehicle 92 arrives on site, the flatbed trailer 90 will tilt about a lifting point 94, as seen in FIG. 5B. Lifting/tilting flatbeds trailers are commercially available from Contral Container Trailer Source Company under the name Model CDU 32. As seen in FIG. 5B, the distal end 96 will be tilted until the distal end 96 contacts the ground. The proximal end 97 is lifted by a driver mechanism. Hence, the flatbed trailer 90 has a first segment 98 (which remains horizontal to the ground) and a second segment 99 which is tilted. The flatbed 90 contains a wench and conveyor rail system so that the skid unit 4 is offloaded from the flatbed trailer 90 via the wench and conveyor system. After the tubular handling functions have been performed by the operator, and according to the teachings of the present disclosure, the system can be loaded onto the flatbed trailer 90 with the wench and conveyor rail system in a like fashion.

Figure 6A:
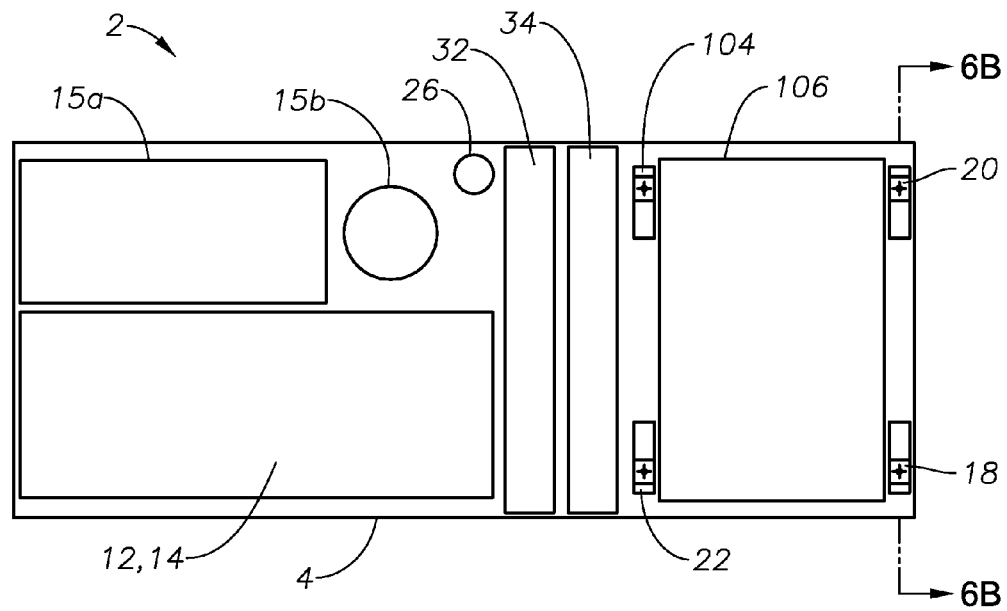
FIG. 6A is a partial top view of the system seen in FIG. 1.

Referring now to FIG. 6A, a partial top view of the system 2 on the skid 4 will now be described. FIG. 6A depicts the spring members 18, 20, 22, 104 that are positioned at four corners of the tong assembly frame 106, and wherein the frame 106 is operatively positioned on the top of the skid 4, as will be more fully described later. Also seen in FIG. 6A is the hydraulic power unit 12, diesel engine means 14, electric generator 15a, electric air compressor 15b, jib crane 26, and folded scissor lift 32, 34.

Figure 6B:
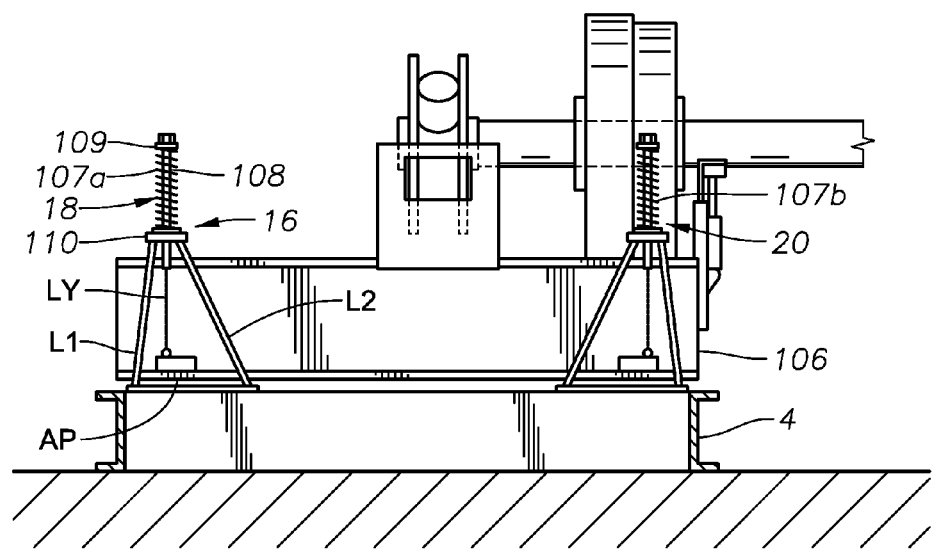
FIG. 6B is a partial cross-sectional view of the spring assembly taken along line "6B" of FIG. 6A.

FIG. 6B is a partial cross-sectional view of the system taken along line "6B" of FIG. 6A. More specifically, FIG. 6B illustrates the spring assemblies (such as spring assembly 16), which includes individual spring members 18, 20, 104 (not seen in this view), and 22 (not seen in this view). The spring assembly includes, in one embodiment, individual coiled springs, such as spring 107a and 107b. The view of FIG. 6B depicts the spring members 18, 20 operatively positioned on the top of the frame 106 and the skid 4. The spring members 18, 20, 22, and 104 are all similar in construction, and therefore, only spring member 18 will be described. The spring member 18 includes coiled spring 107a disposed about a threaded rod 108, wherein a stop structure 109 is provided, and wherein in one embodiment, the stop structure 109 is a nut that is threadedly engaged with the threaded rod 108. The spring 107a will therefore have one end engaged with the stop structure 109 and a second end with a lip 110 of the stand 111. The stand 111 has a plurality of legs, and in one embodiment, the stand is a tripod, with legs L1 and L2 shown. The legs L1 and L2 are attached to the skid 4 which may be by welding. A lanyard LY has a first end attached to the rod 108 and a second end attached to the frame 106 at attachment point AP. The clearance between the tong frame 106 and the skid frame 4, in one embodiment, is two inches. Hence, this clearance allows an area that is used to dissipate the displacement and rotational forces generated during torqueing by allowing the spring assemblies to bias the frame 106 up and down, and back and forth in a 360 degree phase.

Figure 7A:
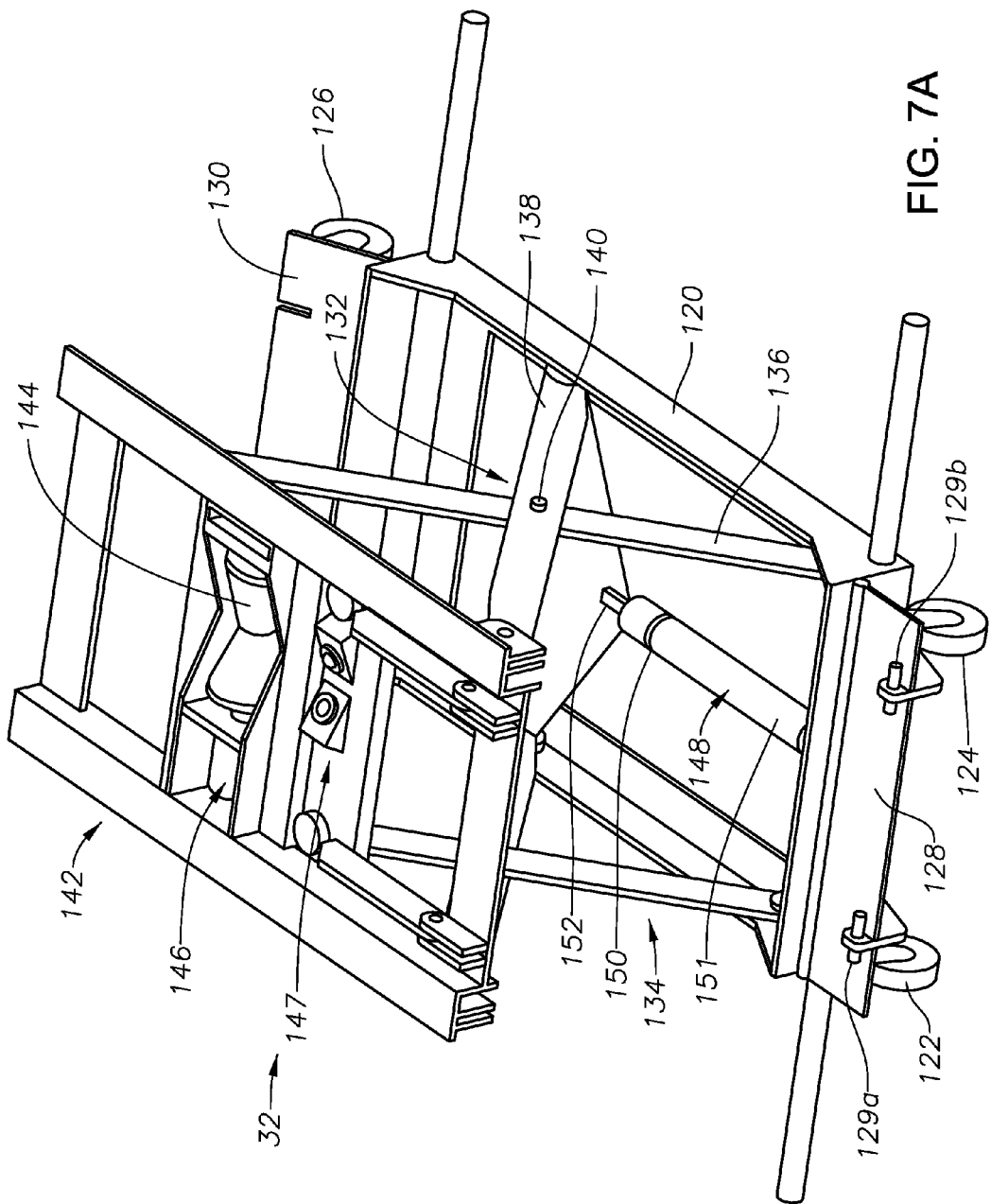
FIG. 7A is a partial view of one embodiment of the tubular platform in the raised position.

Referring now to FIG. 7A, a partial view of one embodiment of the tubular platform 32 in the raised position will now be described. The tubular platform 32 includes a structural base 120 which is rectangular in shape. The base 120 will include wheels such as wheels 122, 124, 126 for movability, and wherein the wheels are attached to a pivoting flap, such as flaps 128, 130, that can be folded for storage or unfolded for use. In other words, the flaps 128, 130 can be folded by removing the pins 129a, 129b, and in this way the tubular platform 32 can rest on the ground which can aid in stability during operations.

The tubular platform 32 will contain a lifting scissor unit. More specifically, a first lifting scissor frame 132 is operatively attached to the base 120 and a second lifting scissor frame 134 is also operatively attached to the base 120. Each scissor lifting frame 132, 134 contains a first arm pivotally connected to a second arm, such as first arm 136 pivotally connected to the second arm 138 at the pivot point pin 140. The first lifting scissor frame 132 and the second lifting scissor frame 134 will connected to a landing 142, wherein the landing 142 is a rectangular structure that provides a platform for resting the tubular, as well as advancing and/or retracting the tubular during operation. FIG. 7A shows the roller 144 for advancing the tubulars as well as the hydraulic motor 146 for powering the rotation of the roller 144. Hydraulic motors are commercially available from White Drive Products under the name RS Motors/200. FIG. 7A also depicts the ball transfer device for dampening the transfer weight of the tubular during advancing and torqueing, seen generally at 147.

FIG. 7A also depicts the hydraulic driver cylinder 148, operatively connected to the hydraulic power unit, for pivoting the lifting scissor frames 132, 134 so that the landing 142 can be raised and lowered. More specifically, the cylinder 148 has a piston 150 disposed within a hydraulic cylinder housing 151 therein, and wherein the hydraulic power unit will act to expand and retract the piston 150 from the cylinder housing 151, as well understood by those of ordinary skill in the art. As seen in FIG. 7A, the housing 151 is attached to the base 120 and the piston 150 is connected to the scissor frames 132, 134 via the connector brace 152, such as connector brace 152 being attached to arm 138. Hence, as the piston 150 expands and retracts from housing 151, the scissor frames 132, 134 will expand and retract, and the landing 142 will be raised and lowered.

Figure 7B:
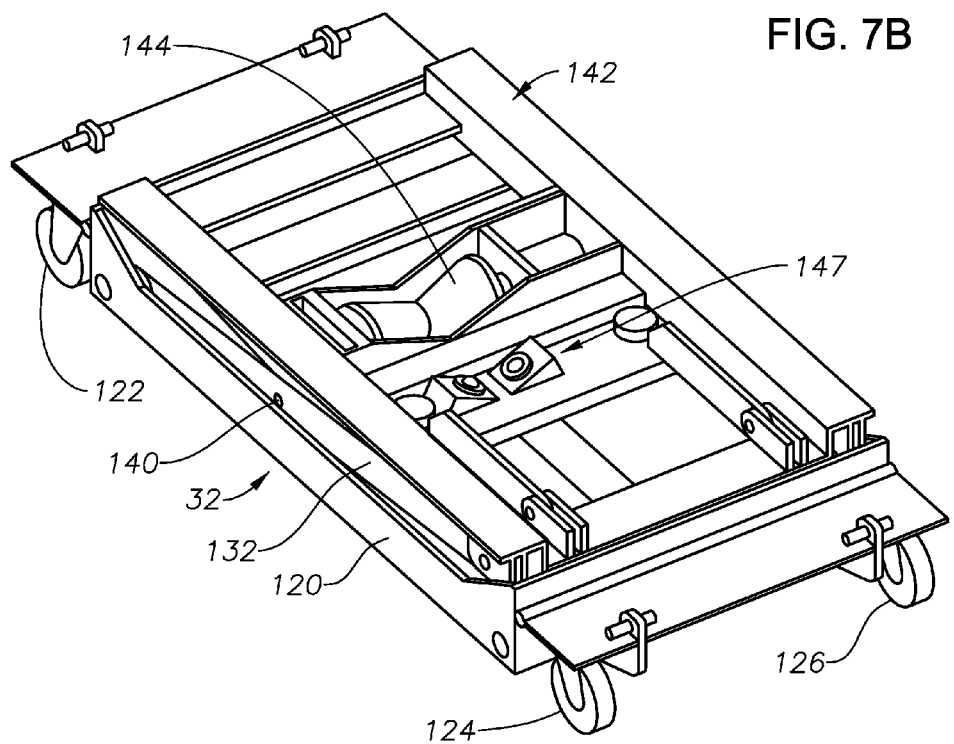
FIG. 7B is a partial view of the tubular platform seen in FIG. 7A in the lowered position.

FIG. 7B is a partial view of the tubular platform 32 seen in FIG. 7A in the lowered (i.e. collapsed) position having been collapsed along the pivot point pin 140. In the position shown in FIG. 7B, the operator may stow the tubular platform 32 onto the skid for transportation. FIG. 7B depicts the base 120 with the wheels 122, 124, 126 operatively attached for movement. The landing 142 is shown along with the roller 144 and ball transfer device 147.

Figure 7C:
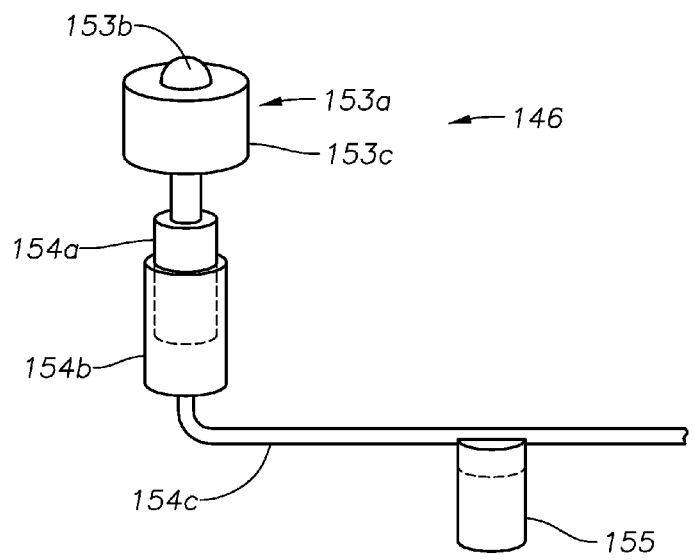
FIG. 7C is a schematic of one embodiment of the ball transfer device.

FIG. 7C is a schematic of the ball transfer device 146, which includes a flange socket ball transfer unit 153a. The flange socket ball transfer unit 153a is commercially available from Omni Track under the name Flange Socket 93 Series. The ball transfer unit 153a includes a ball 153b which is secured within a housing (i.e. socket) 153c. The ball transfer device 146 also includes a hydraulic piston device which includes a piston activator shaft 154a that extends from hydraulic housing 154b. The housing 154b is connected via a hydraulic line 154c, wherein the line 154c may, but not necessarily, contain a hydraulic fluid accumulator 155. The line 154c is connected to the hydraulic pump and thus is controlled by the operator via the control unit 10. Thus, the operator can raise the ball transfer unit 153a to engage, lift and allow rotation of the tubular. The ball allows rotation in all phases (i.e. 360 degree phase). Also, due to the connection with the hydraulic fluid system, the ball transfer device 153a allows for dampening the transfer weight of the tubular member during torqueing.

Figure 8:
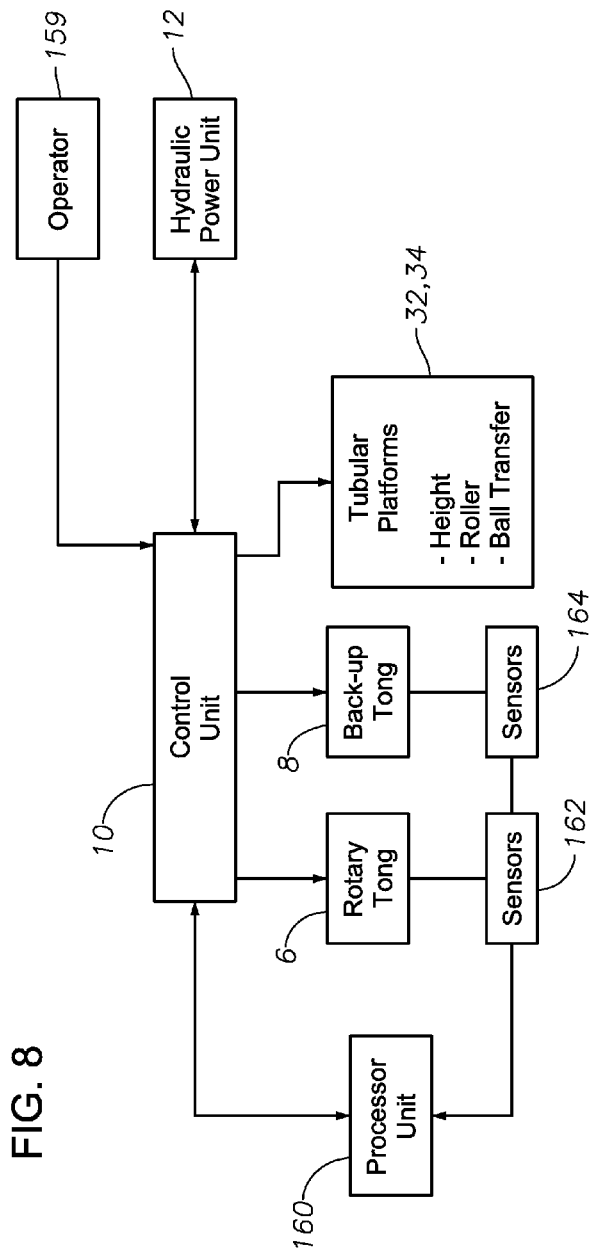
FIG. 8 is a process flow chart of the sensor and processor unit associated with one embodiment of the present system.

Referring now to FIG. 8, a process flow chart of one embodiment of the sensor and processor unit associated with the present system will now be described. The control unit 10 receives inputs from an operator 159, the hydraulic power unit 12 as well as the processor unit 160. The control unit 10 will output hydraulic fluid to the rotary tong 6 and the back-up tong 8. In one embodiment, during the process of operating the tong assembly, a sensor 162 is operatively associated with the rotary tong 6 and a sensor 164 is operatively associated with the back-up tong 8. The sensors 162, 164 will detect the torque applied to the connections of the tubulars. The sensors 162, 164 will transmit a signal to the processor unit 160, wherein the processor unit 160 will receive the sensor reading, store the sensor reading, process the sensor reading, and display the sensor reading to the operator. The processor unit 160 may be a desktop computer commercially available from McCoy Global under the name FarrWincatt.

The control unit 10 is also operatively connected to the tubular platforms 32, 34, and in particular, the control unit 10 can act to supply hydraulic fluid to the hydraulic drive cylinder 148 so that the tubular platforms 32, 34 may be raised or lowered. Also, the control unit 10 can act to supply hydraulic fluid to the rollers on the platforms 32, 34 so as to advance and retract the tubulars into and out of the tong assembly. Additionally, the control unit 10 will supply hydraulic pressure to the ball transfer device 153a so that the ball transfer device 153a is lifted and lowered during the make-up or breaking of the tubular connections as previously set-forth.

Figure 9:
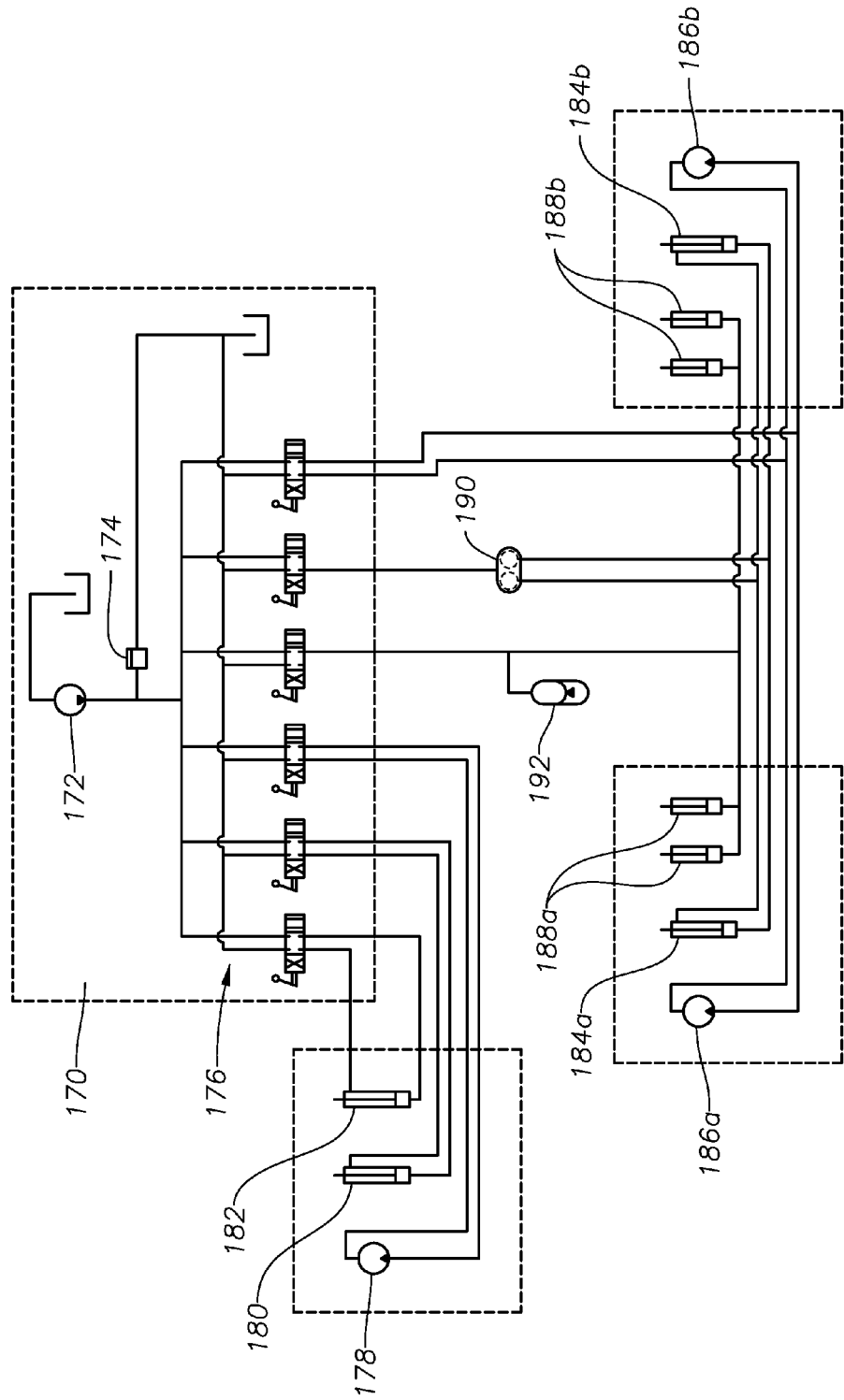
FIG. 9 is a schematic on one of the embodiments of the present hydraulic system.

FIG. 9 is a schematic of one of the embodiments of the hydraulic system. More specifically, FIG. 9 depicts the hydraulic power unit 170 which includes the oil pump 172, regulator 174 and the valve bank 176. The pump 172, regulator 174 and valve bank 176 are all commercially available from McCoy Global under the name Type 3 Bucking Unit (Power Unit & Control Console) CLEBU 1175-3. While a total of six (6) banks are shown, it is possible to use more banks or less banks as needed. FIG. 9 also shows the tong hydraulic motor 178, the clamp cylinder 180 and the lift pipe centering guide cylinder 182. The scissor lift cylinder units 184a, 184b are depicted along with the pipe roller motors 186a, 186b. The lift cylinders 188a, 188b for the ball transfer devices are also displayed on the schematic. A hydraulic splitter 190 is a gear type splitter commercially available from Haldex Barnes under the name Hydraulic Flow Divider, wherein the splitter 190 allows both of the scissor lifts to rise and lower evenly together. An hydraulic accumulator 192 absorbs hydraulic fluid and pressure fluctuations during operation of the scissor lifts.

Figure 10:
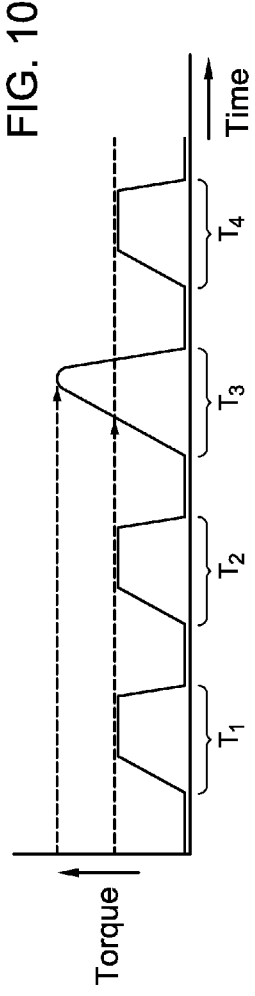
FIG. 10 is an exemplary graph of the torque applied by one embodiment of the present system.

FIG. 10 is an example graph of the torque applied by one embodiment of the present system. The graph includes the torque in foot-pounds on the vertical axis and the time on the horizontal axis. The horizontal axis depicts four time intervals that torque was applied, namely T1, T2, T3, T4. For the time intervals T1, T2, T4, the torque applied may represent approximately 5,000 foot-pounds, which is in the acceptable torque range. However, during the time interval T3, the applied torque is 10,000 foot-pounds which is above an acceptable range (note these numbers are for exemplary purposes only). Therefore, the operator may need to take corrective action as necessary. The corrective action may include inspection and/or disguarding of the tubular. Additionally, since the processor unit 160 records the torque data, a record may exist for future uses at the direction of the operator.

Although the present invention has been described in considerable detail with reference to certain preferred versions thereof, other versions are possible. Therefore, the spirit and scope of the appended claims should not be limited to the description of the preferred versions contained herein.

We claim:

1. A modular system for connecting a first tubular with a second tubular, the system comprising:
  a skid;
  a tong assembly operatively associated with said skid, said tong assembly including:
    a rotary tong for applying a torque force to the first tubular, said rotary tong having a receiving end for receiving the first tubular;
    a back-up tong, operatively associated with said rotary tong, for providing a fixed point for torqueing the first tubular, said back-up tong configured to receive and grasp the second tubular;
  a hydraulic power unit, operatively positioned on said skid, for providing hydraulic power to said rotary tong and said back-up tong;
  a spring assembly including:
    a plurality of spring stands attached to said skid, wherein each of said spring stands has a top end;
    a frame containing said tong assembly;
    a plurality of springs having a proximal end abutting said top end of said spring stands;
    a plurality of rods disposed within said springs, each of said rods containing a stop structure, and wherein said springs have a distal end abutting said stop structure;
    a plurality of lanyards attached to said rods on a first end and attached to a base on a second end so that vibratory and displacement forces created during torqueing of the first tubular onto the second tubular are absorbed.

2. The system of claim 1 further comprising:
sensor means, operatively positioned on said skid, for sensing an applied torque to the first tubular and the second tubular, and generating a sensor signal;
processor means for receiving the sensor signal and generating a torque reading.

3. The system of claim 2 further comprising:
a control unit for receiving said torque reading from said processor means and producing a command signal to said hydraulic power unit to provide hydraulic power to said rotary tong and said back-up tong.

4. The system of claim 3 further comprising:
a tubular platform, operatively associated with the hydraulic power unit, for raising the first tubular for entry into said tong assembly;
advancing means, positioned on said tubular platform, for advancing the first tubular to the tong assembly.

5. The system of claim 4 further comprising:
a ball transfer device positioned on said tubular platform including:
a ball positioned within a socket, said ball configured to engage the first tubular, said ball capable of rotating in a 360 degree phase;
a hydraulic activator shaft operatively attached to said hydraulic power unit, said hydraulic power unit capable of delivering hydraulic fluid to said activator shaft so that said ball lifts and lowers during torqueing of the tubular member.

6. A modular system for threadedly connecting a tubular member with a collar, the system comprising:
a skid;
a tong assembly operatively associated with said skid, said tong assembly including:
a rotary tong for applying a torque force to the tubular member, said rotary tong having a receiving end for receiving the tubular member or collar;
a back-up tong, operatively associated with said rotary tong, for providing a fixed point for torqueing the tubular member, said back-up tong configured to receive and grasp the collar or the tubular member;
a spring assembly, operatively attached to said skid, for absorbing vibratory and displacement forces created during torqueing of the tubular member onto the collar;
a hydraulic power unit, operatively positioned on said skid, for providing hydraulic power to said rotary tong and said back-up tong;
sensor means, operatively positioned on said skid, for sensing an applied torque to the tubular member and the collar by the rotary tong as a sensor reading;
processor unit for receiving the sensor reading, storing the sensor reading, processing the sensor reading, and displaying the sensor reading;
a tubular platform, operatively associated with the hydraulic power unit, for raising the tubular member for entry into said tong assembly.

7. The system of claim 6 wherein said spring assembly comprises:
a plurality of spring stands attached to said skid, wherein said spring stands have a top end;
a frame having attached thereto said tong assembly;
a plurality of springs operatively associated with said spring stands, said springs having a proximal end abutting said top end of said spring stands;
a plurality of rods disposed within said springs, each of said rods containing a stop structure threadedly engaged with thread means on each of said rods, and wherein said springs have a distal end abutting said stop structure;
a plurality of lanyards attached to said rods on a first end and attached to said frame on a second end so that vibratory and displacement forces created during torqueing of the tubular member with the collar are absorbed.

8. The system of claim 7 further comprising:
advancing means, positioned on said tubular platform, for advancing the tubular member relative to said tong assembly.

9. The system of claim 8 wherein a truck is utilized to transport the system to a rig site, wherein the system further comprises:
a flatbed configured to contain the skid, wherein said flatbed contains a first segment containing the skid and a second segment attached to the truck, wherein said first and second segments are operatively attached.

10. The system of claim 9 further comprising:
a crane mounted to said skid, said crane having a swing arm extending from a vertically mounted arm.

11. The system of claim 8 wherein said processor unit further comprises:
a graphing module, operatively connected to said processor unit, for printing a graph of the torque applied to the tubular member and the collar thread connection.

12. The system of claim 11 wherein said tubular platform comprises:
a base having a set of wheels for movability;
a lifting scissor unit operatively attached to said base, said lifting scissor unit configured to be raised and lowered by said hydraulic power unit;
a landing operatively attached to said lifting scissor unit, and wherein said tubular member rests on said landing.

13. The system of claim 12 further comprising:
a ball transfer means, operatively attached to said landing, for dampening the transfer of weight of the tubular member during torqueing.

14. The system of claim 13 wherein said ball transfer means comprises:
a ball positioned within a housing, said ball configured to engage the tubular member, said ball capable of rotating in a 360 degree phase;
a hydraulic activator shaft operatively attached to said hydraulic power unit, said hydraulic power unit capable of delivering hydraulic fluid to said activator shaft so that said ball lifts and lowers during torqueing of the tubular member.

15. The system of claim 12 wherein said lifting scissor unit comprising:
a first scissor frame containing a first member pivotally attached to a second member;
a second scissor frame containing a third member pivotally attached to a fourth member;
a hydraulic driver cylinder, operatively connected to said hydraulic power unit, for pivoting said first and second scissor frames so that said landing can be raised and lowered.

16. The system of claim 15 wherein said hydraulic driver cylinder includes a piston disposed within a housing, and said housing is connected to said first scissor frame and said piston is connected to said second scissor frame.

17. A modular system for connecting a tubular member with a collar, the system comprising:
a skid;
a tong assembly operatively associated with said skid, said tong assembly including:

a rotary tong for applying a torque force to the tubular member, said rotary tong having a receiving end for receiving the tubular member;

a back-up tong, operatively associated with said rotary tong, for providing a fixed point for torqueing the tubular member, said back-up tong configured to receive and grasp the collar;

a hydraulic power unit, operatively positioned on said skid, for providing hydraulic power to said rotary tong and said back-up tong, a spring assembly including:
   a plurality of spring stands attached to said skid, wherein said spring stands have a top end;
   a frame containing said tong assembly;
   a plurality of springs having a proximal end abutting said top end of said spring stands;
   a plurality of rods disposed within said springs, each of said rods containing a stop structure, and wherein each of said springs has a distal end abutting said stop structure;
   a plurality of lanyards attached to said rods on a first end and attached to a base on a second end so that vibratory and displacement forces created during torqueing of the tubular member onto the collar are absorbed.

18. The system of claim 17 further comprising:
sensor means, operatively positioned on said skid, for sensing an applied torque to the tubular member and the collar, and generating a sensor signal;
processor means for receiving the sensor signal and generating a torque reading.

19. The system of claim 18 further comprising:
a control unit for receiving said torque reading from said processor means and producing a command signal to said hydraulic power unit to provide hydraulic power to said rotary tong and said back-up tong.

20. The system of claim 19 further comprising:
a tubular platform, operatively associated with the hydraulic power unit, for raising the tubular member for entry into said tong assembly;
advancing means, positioned on said tubular platform, for advancing the tubular member to the tong assembly.

21. The system of claim 20 further comprising:
a ball transfer device including:
   a ball positioned within a socket, said ball configured to engage the tubular member, said ball capable of rotating in a 360 degree phase;
   a hydraulic activator shaft operatively attached to said hydraulic power unit, said hydraulic power unit capable of delivering hydraulic fluid to said activator shaft so that said ball lifts and lowers during torqueing of the tubular member.

22. The system of claim 21 wherein a truck is utilized to transport the system to a rig site, wherein the system further comprises:
a flatbed configured to contain the skid, wherein said flatbed contains a first segment containing the skid and a second segment attached to the truck, wherein said first and said second segments are operatively attached.

23. The system of claim 22 further comprising:
a crane mounted to said skid, said crane having a swing arm extending from a vertically mounted arm.

24. The system of claim 21 wherein said tubular platform comprises:
a base having a set of wheels for movability;
a lifting scissor unit operatively attached to said base, said lifting scissor unit configured to be raised and lowered by said hydraulic power unit;
a landing operatively attached to said lifting scissor unit, and wherein said tubular member rests on said landing.

25. The system of claim 24 wherein said lifting scissor unit comprises a first scissor frame containing a first member pivotally attached to a second member and a second scissor frame containing a third member pivotally attached to a fourth member, a hydraulic cylinder, connected to said hydraulic power unit, for pivoting said first and second frame, and wherein said hydraulic cylinder includes: a piston disposed within a housing, wherein said housing is connected to said first scissor frame and said piston is connected to said second scissor frame so that as said piston expands, said landing is raised.

26. A spring assembly for a tong assembly used to torque a tubular with a collar comprising:
a plurality of spring stands attached to a skid, wherein each of said spring stands has a top end;
a frame having attached thereto the tong assembly;
a plurality of springs operatively associated with said spring stands, each of said springs having a proximal end abutting said top end of said spring stands;
a plurality of rods disposed within said springs, each of said rods containing a stop structure, and wherein each of said springs has a distal end abutting said stop structure;
a plurality of lanyards attached to said rods on a first end and attached to a base on a second end so that vibratory and displacement forces created during torqueing of the tubular member with the collar are absorbed.

27. A modular system for making-up a tubular member with a collar, the system comprising:
a skid;
a tong assembly operatively associated with said skid, said tong assembly including:
   a rotary tong for applying a torque force to the tubular member, said rotary tong having a receiving end for receiving the tubular member;
   a back-up tong, operatively associated with said rotary tong, for providing a fixed point for torqueing the tubular member, said back-up tong configured to receive and grasp the collar;
a hydraulic power unit, operatively positioned on said skid, for providing hydraulic power to said rotary tong and said back-up tong;
a spring assembly, operatively attached to said skid, for absorbing vibratory and displacement forces created during torqueing the tubular member onto the collar;
sensor means, operatively positioned on said tong assembly, for sensing an applied torque to the tubular member and the collar by said rotary tong;
reading means, operatively associated with said sensor means, for reading the applied torque from said sensor means;
recording means, operatively connected to said reading means, for recording the applied torque.

28. The system of claim 27 further comprising:
a tubular platform, operatively associated with the hydraulic power unit, for raising the tubular member for entry into said rotary tong;
advancing means, positioned on said tubular platform, for advancing the tubular member to the rotary tong.

29. The system of claim 28 wherein said tubular platform comprises:
a base having a set of wheels for movability;
a lifting scissor unit operatively attached to said base, said lifting scissor unit configured to be raised and lowered by said hydraulic power unit;

a landing operatively attached to said lifting scissor unit, and wherein said tubular member rests on said landing.

30. The system of claim 29 wherein said lifting scissor unit comprising:
a first scissor frame containing a first member pivotally attached to a second member;
a second scissor frame containing a third member pivotally attached to a fourth member.

31. The system of claim 30 wherein said lifting scissor unit further comprises:
a hydraulic driver cylinder, operatively connected to said hydraulic power unit, for pivoting said lifting scissor unit so that said landing can be raised and lowered.

32. The system of claim 31 wherein said hydraulic driver cylinder includes a piston disposed within a housing, and said housing is connected to said first scissor frame and said piston is connected to said second scissor frame so that an extension of said piston raises said first and said second scissor frames which lift said landing thereby raising the tubular member.

33. The system of claim 32 wherein a truck is utilized to transport the system to a rig site, wherein the system further comprises:
a flatbed configured to contain the skid, wherein said flatbed contains a first segment containing the skid and a second segment attached to the truck, wherein said first and second segments are operatively attached.

34. The system of claim 32 further comprising:
a crane mounted to said skid, said crane having a swing arm extending from a vertically mounted arm.

35. The system of claim 32 wherein said spring assembly comprises:
a plurality of spring stands attached to said skid, wherein each of said spring stands has a top end;
a frame having attached thereto said tong assembly;
a plurality of springs operatively associated with said spring stands, each of said springs having a proximal end abutting said top end of said spring stands;
a plurality of rods disposed within said springs, each of said rods containing a stop structure threadedly engaged with thread means on each of said rods, and wherein each of said springs have a distal end abutting said stop structure;
a plurality of lanyards having a first end and a second end, said first end attached to said rods and said second end attached to said frame so that vibratory and displacement forces created during torqueing of the tubular member with the collar are absorbed by the springs.

36. The system of claim 35 further comprising:
a ball transfer means, operatively attached to said landing, for dampening the transfer of weight of the tubular member during torqueing.

37. The system of claim 36 wherein said ball transfer means comprises:
a ball positioned within a socket, said ball configured to engage the tubular member, said ball capable of rotating in a 360 degree phase;
a hydraulic activator shaft operatively attached to said hydraulic power unit, with a hydraulic line capable of delivering hydraulic fluid to said socket so that said ball lifts into engagement with the tubular member during torqueing of the tubular member.

38. The system of claim 37 wherein said advancing means comprises a roller positioned on said tubular platform; a hydraulic motor operatively attached to said roller for rotating said roller so that the tubular member may be moved in a forward or backward direction relative to said tong assembly.

* * * * *